J. J. BUKOLT.
TIRE ARMOR.
APPLICATION FILED MAY 9, 1912.
1,061,523.  Patented May 13, 1913.
2 SHEETS—SHEET 1.
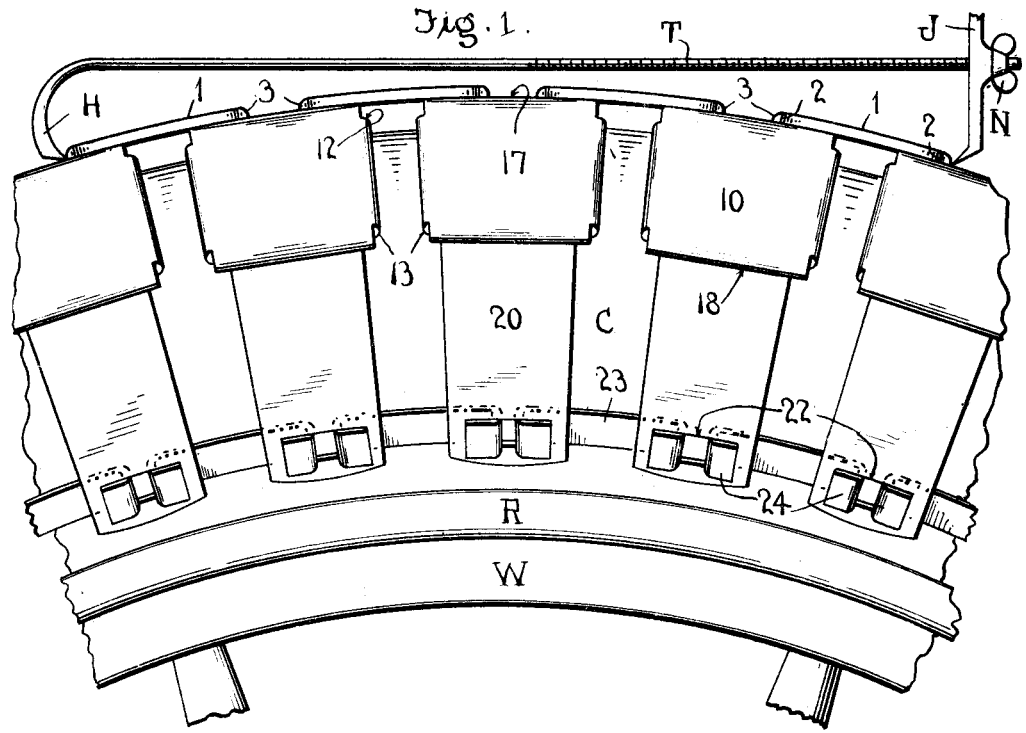
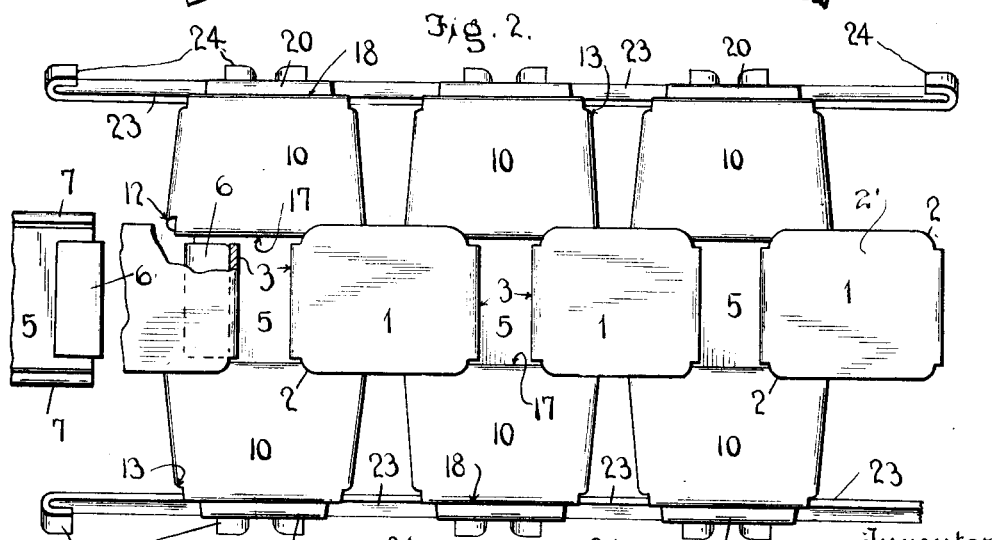
Witnesses
L. B. James
N. L. Collamer
Inventor
J. J. Bukolt
by H. B. Wilson & Co.
Attorneys

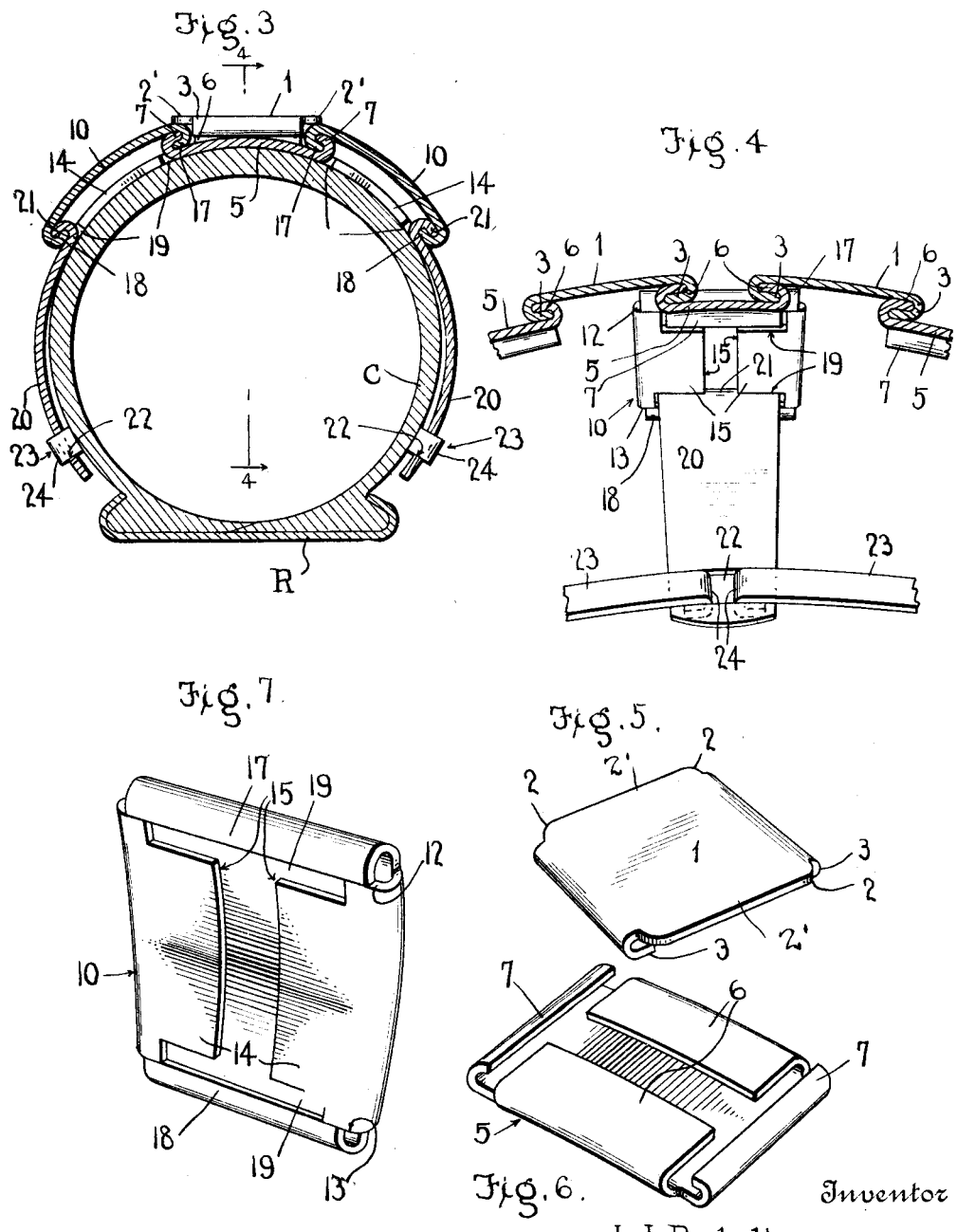

UNITED STATES PATENT OFFICE.

JOHN J. BUKOLT, OF STEVENS POINT, WISCONSIN.

TIRE-ARMOR.

1,061,523.  Specification of Letters Patent.   Patented May 13, 1913.

Application filed May 9, 1912. Serial No. 696,174.

*To all whom it may concern:*

Be it known that I, JOHN J. BUKOLT, a citizen of the United States, residing at Stevens Point, in the county of Portage and State of Wisconsin, have invented certain new and useful Improvements in Tire-Armor; and I do declare the following to be a full, clear, and exact description of the invention, such as will enable others skilled in the art to which it appertains to make and use the same.

This invention relates to resilient tires, and more especially to those which are externally armored; and the object of the same is to produce a flexible metallic armor adapted more especially for application to automobile tires. These and other objects are accomplished by this construction hereinafter more fully described and claimed, and as shown in the drawings wherein—

Figure 1 is a side elevation of a section of the improved armor, and Fig. 2 is a plan view thereof; Fig. 3 is a cross section through an automobile casing with this improved armor thereon, and Fig. 4 is a section on the line 4—4 of Fig 3, omitting the casing. Fig. 5 is a perspective detail of one of the outer members of the tread section, and Fig. 6 is a perspective detail of one of the inner members thereof; Fig. 7 is a perspective detail of one of the side sections of this improved armor; Fig. 8 is an edge view showing two of the links of different lengths, as described hereinafter.

In said views of the drawings the letter W designates a wheel having a rim R, and the letter C designates a tire casing mounted on the rim and around which it is desired to apply my metallic tire armor. Broadly speaking, the latter comprises a tread section or strip made up of inner and outer members, two side sections, a series of clasps attached to the members of the side sections, and two series of links connecting the clasps; and these different parts will now be described.

The tread section of this improved armor will of course receive the most wear, as the direct weight of the wheel and all that it carries rests upon the members thereof. It is made up of outer members, one of which is seen in Fig. 5, each comprising a substantially square metallic body 1 of such a size that it may be flat throughout, and its corners 2 rounded off a trifle as shown, while 3—3 are oppositely disposed inturned hooks extending across the front and rear edges of this member and necessarily shorter than its transverse dimension because of the rounded corners 2—thus leaving flanges 2' projecting from both sides of the member for a purpose to appear presently. The inner members of the tread section, whereof one is best seen in Fig. 6, have also a rectangular and nearly square body 5 with outturned hooks 6, 6 at its front and rear edges adapted to engage those numbered 3 in the outer member just described; but the body 5 of this member is curved transversely so that it will fit across the outer or tread surface of the casing C as seen, and at its side edges it is provided with outwardly curved hooks 7 whose open throats stand beneath the projecting flanges 2' along the side edges of the body 1 of the outer member as seen in Fig. 3. The tread section of this armor is composed of alternately disposed outer and inner members hooked together as just described, with the curved inner face of the bodies 5 of the inner members lying across the tread surface of the tire and the flat outer face of the bodies 1 of the outer members exposed so as to make contact with the roadway.

The side sections of this improved tire armor are each made up of a number of individual members, whereof one is best illustrated in Fig. 7. Each has a body 10 curved slightly from its upper to its lower edge and also by preference tapering in the same direction, inturned hooks 17 along its upper edge adapted to engage the side hooks 7 of one of the inner tread members, and a similar inturned hook 18 along its lower edge for a purpose to appear below. Each of the remaining two edges of this member is bent or rolled inward as at 11 so that the upper and lower extremities of the roll close the extreme ends of the hooks 17 and 18, and the sheet metal of which this member is by preference made is then reduced in width so as to provide upper and lower shoulders 12 and 13, and thence continued inward in a tongue 14 which is curved slightly throughout its height to conform with the curvature of the body member 10 and whose inner end 15 is spaced slightly from the corresponding end of the tongue on the opposite side of this member. The fact that the two tongues 14 are of less height than the two rolls 11 leaves the throats 19 of the hooks 17 and 18 exposed, the throat of the upper hook 17 receiving the side hook 7 on the inner tread member described above, and throat of the lower hook 18 being for a purpose yet to be explained. There are two of these side members for each inner member of the tread section, and when hooked thereto they extend from the tread proper down along the sides of the outer portion of the casing C for some little distance as best seen in the cross sectional view in Fig. 3, their function obviously being to sustain that portion of the load which is not carried by the tread proper. The curved tongues 14 resting against the outer face of the casing will not wear the latter any more than the curved inner face of the body 5 of the inner tread member. The various side members are not connected with each other, but as each is connected with the hook 7 of one of the inner tread members in such manner that it cannot become displaced until the armor is taken off of the casing, these side members will not need to be connected with each other in any other way. The clasp members of this improved armor are also not directly connected with each other, but they are disposed in two series next inside the side members above described and are connected at their outer extremities therewith as shown. Each clasp (as illustrated in Fig. 4) has a substantially rectangular body 20 curved slightly throughout its length so as to fit the side of the casing C, its upper or outer end being provided with an outturned hook 21 of a proper size to pass through the lower throat 19 and engage the lower hook 18 on the side member immediately above this clasp, and its body being provided near its inner end with a square hole 22. These members, like all those which have been described, are by preference stamped from sheet metal of the required thickness and stiffness.

Finally I provide two series of links stamped from sheet metal, the bodies 23 of the links being straight and their extremities being hooked as at 24 so that they may be engaged within the square holes 22 in the clasp members 20. In Fig. 8 I have shown one rather longer link 25, although it has the same hooks as 24 at its extremities, and the purpose of this hook will be explained.

In assembling the parts of this improved tire armor, the members of the tread section are connected by interengaging their hooks 3 and 6, next the side members are put in place by engaging a side hook 7 of each inner tread member with an upper hook 17 of each side member and turning the latter down against the casing C, each clasp member 20 is likewise put in place by engaging its hook 21 with the lower hook 18 of one of the side members, and its body also is turned against the side of the casing C, and finally the chains are applied by engaging their hooks 24 with the holes 22 of the clasps 20, and as the length of each chain around the wheel is less than if it stood farther from its hub than where the chains are located, the latter can not of course slip off. Their tension is sufficient to hold the clasps in place, and the hooks 21 of the clasps cannot disengage from the side members because of the shoulders 13 at the extremities of the lower throat 19; in like manner the side members cannot slip off the hooks 7 of the inner tread members, because of the presence of the shoulders 12 at the extremities of the throat 19 of the upper hooks 17; and it has been shown how the inner tread members are engaged with the outer tread members in a continuous band or chain leading around the tread of the casing C, so that it follows that the entire armor constitutes a metallic protector covering the tread of the casing, those portions whereon wear occurs, and in fact the sides of the casing down to the points or lines where the chains occur. The latter and the clasp lie close against the sides of the casing, whereas the side members and the outer members of the tread section are spaced from the casing as shown in the cross sectional view Fig. 3. The openings between the inner ends 15 of the hooks or tongues 14 on the side members prevent the accumulation of dirt within them, and also the fact that the rolls 11 are omitted opposite the ends of the hooks 17 and 18 prevents the accumulation of dirt under these hooks. As the members of the tread section of this armor undergo a constant kneading as the casing successively is compressed and expanded at each revolution of the wheel, it is highly improbable that dirt and mud will accumulate therein. Therefore this entire armor may be said to be self-cleaning. I do not confine myself to the proportions, materials, or exact construction of parts further than as set forth in the appended claims, and whereof changes in details may be made without departing from the principle of the invention.

The utility of the short links 23 of the chain (some of which will be furnished the consumer with each armor) lies in the fact that, when this armor becomes loose either because of wear between its parts or because of wear on the casing C, shorter links 23 may be substituted for longer links 25 here and there throughout the length of the chain at either side of the casing, and some of the elements of the armor removed. This is done by means of a tool illustrated in the drawings which may consist of a hook H having a threaded shank T on which screws a nut N, and a jaw J slidably mounted on said shank inside the nut. By applying this tool to the armor in the manner illustrated, and then tightening up the nut N, the tension on the armor between the bill of the hook and the inner end of the jaw is reduced to such an extent that one each of the members 1 and 5, and two each of the members 10 and 20 can be removed at one point throughout the length of the armor if the latter is only moderately loose, and the same operation might be repeated elsewhere if the armor is considerably loose. Thereafter, by tightening up on the nut N still further the armor at either side of the blank thus left is drawn with its ends closed together until one of the hooks 23 or 25 can be put into place to connect the contiguous clasps 20, the hooks on the other members being inter-engaged in the manner above described. Afterward the tool is removed, and preserved for future use.

I lay no claim in this application to the tool or the use of the tool, for obviously the tire might be held by other means while members were being removed; but I do claim that the armor itself is constructed in such manner that elements may be removed to reduce it in length so as to take up for wear, and I claim a special advantage in providing each tire with several of the links 23 and 25 of variable lengths so as to accommodate the adjustments thus effected.

What is claimed as new is:—

1. The herein described tire armor made up of a tread section comprising inner and outer members and flexible connections between them, the inner members having their side edges hooked outwardly; two side sections, each composed of a series of plates having hooks at their outer ends engaging the hooks of said inner members, the said connections preventing the longitudinal disengagement of such hooks; and two ring-shaped members smaller than the largest circumference of the tire, and connections between said rings and the side sections.

2. In a tire armor, the combination with a tread composed of members flexibly connected and certain of them having outturned hooks at their sides; of two side sections, each made up of a number of plates whose bodies have inturned hooks across their outer ends engaging the hooks on said tread members, and their side edges rolled inward in tongues underlying the throats of said hooks, for the purpose set forth.

3. In a tire armor, the combination with a tread composed of members flexibly connected and certain of them having outturned hooks at their sides; of two side sections, each made up of a number of plates whose bodies have inturned hooks across both ends, those at the outer ends engaging the hooks on said tread members, their side edges rolled inward and reduced and continued inward in tongues underlying the throats of both said hooks, two series of clasps each made up of a number of plates having outturned hooks at their upper ends engaging the lower hooks on said side sections; and means for holding the clasps on the tire.

4. In a tire armor, the combination with a tread section comprising a number of outer members each having a substantially rectangular flat body with round corners and inturned hooks at opposite sides thereof, and a number of inner members each having a transversely curved body with outturned hooks at two opposite sides engaging the inturned hooks of the outer members and additional hooks at the remaining sides of said body; of side members complementing the tread section and making up said armor, and means for holding the members in engagement with the side hooks of the inner members of the tread section.

5. In a tire armor, the combination with a tread composed of members flexibly connected and certain of them having hooks at their sides; of two side sections, each made up of a number of plates whose bodies have inturned hooks across their outer ends engaging the hooks on said tread members, and their side edges rolled inward to close the lateral extremities of said hooks and reduced and continued inward in tongues underlying the throats of said hooks, for the purpose set forth.

6. In a tire armor, the combination with a tread composed of members flexibly connected and certain of them having hooks at their sides; of two side sections, each made up of a number of plates whose bodies have inturned hooks across their outer ends engaging the hooks on said tread members, their side edges rolled inward to close the extremities of said hooks and reduced and continued inward in tongues underlying the throats of said hooks, and their inner ends hooked inward beneath said tongues; two series of clasps each made up of a number of plates having outturned hooks at their upper ends engaging the lower hooks on said side sections; and means for holding the clasps on the tire.

7. The herein described tire armor made up of a tread section comprising outer members each having a substantially square body with rounded corners and inturned hooks along its front and rear ends, the hooks being of less length than the transverse dimension of the body so as to leave projecting flanges along its side edges, and inner members each having a rectangular body with outturned hooks along both ends and both sides, the former engaging the hooks on the outer members; two side sections each consisting of a series of plates having their outer ends inwardly hooked and engaging the side hooks of said inner members beneath the flanges on said outer members; two ring-shaped members each smaller than the largest circumference of the tire, and connections between them and said side sections.

In testimony whereof I have hereunto set my hand in presence of two subscribing witnesses.

JOHN J. BUKOLT.

Witnesses:
F. F. SHIPPIY,
JOHN JOSEPHOVICS.